United States Patent [19]
Borovikova et al.

[11] 4,130,901
[45] Dec. 19, 1978

[54] PLASTICATION ARRANGEMENT IN A MACHINE FOR PROCESSING POLYMERIC MATERIALS

[76] Inventors: Sofia M. Borovikova, ulitsa Kravchenko, 4, korpus 1, kv. 21, Moscow; Evgeny V. Lurie, stantsia Udelnaya, ulitsa Solnechnaya, 9, Moskovskaya oblast; Valery F. Mikhailov, Schelkovskoe shosse, 86, kv. 28, Moscow, all of U.S.S.R.

[21] Appl. No.: 831,410

[22] Filed: Sep. 8, 1977

[51] Int. Cl.² .............................................. B29B 1/10
[52] U.S. Cl. .................................................. 366/163
[58] Field of Search ............................ 366/22, 79–84, 366/133, 139, 149, 163, 164, 156, 191

[56] References Cited
U.S. PATENT DOCUMENTS

| 3,410,530 | 11/1968 | Gilman | 366/163 |
| 4,063,718 | 12/1977 | Koch | 366/139 |

*Primary Examiner*—Leonard D. Christian
*Attorney, Agent, or Firm*—Burgess, Ryan and Wayne

[57] ABSTRACT

The characteristic feature of the arrangement according to the invention, which comprises a charging hopper and a screw for conveying polymeric material for processing enclosed in a heated casing, consists in that, in the zone of charging the material from the hopper to the screw, there is provided a device for creating reduced pressure within the casing which contributes to the flow of material from the hopper into the screw passage.

9 Claims, 4 Drawing Figures

PLASTICATION ARRANGEMENT IN A MACHINE FOR PROCESSING POLYMERIC MATERIALS

The invention relates to the field of processing polymer compositions, and more particularly to a plastication arrangement in a machine for processing polymeric materials having low bulk weight.

The invention may be employed in the chemical plants specialized in the field of processing plastics (such as highly filled polymer composition) into industrial products to be used in automotive, radiotechnical, electrical and mechanical engineering.

At present, machines for processing polymer compositions into industrial products (such as moulding machines, extruders and the like) are well known. One of the main assemblies of such machines is a plastication arrangement which effects heating, stirring and plastication of a composition. Machines for processing polymer compositions may comprise a plastication arrangement provided with a degasing zone. The plastication arrangements of such type comprise a heated cylindrical casing with a charging opening having a hopper containing a polymer composition, and a screw mounted within the casing coaxially therewith. The screw is rotatable about its axis and functions as a conveyor screw. The screw of the degasing plastication arrangement is made in such a manner that the screw passage has a variable volume which progressively decreases from the charging zone towards the degasing zone. In the degasing zone, the passage volume abruptly increases and is than progressively reduced towards the zone of expulsion of the material into a moulding device. The casing of the degasing plastication arrangement has an opening in the degasing zone for removal of low molecular weight fractions of the polymer, moisture and gas inclusions. The above-described arrangement functions in the following manner. The composition being processed is supplied from the hopper through the charging opening under gravity into the passage of the rotary screw, and under the conveying action of the screw, the composition is displaced along the heated casing. The polymer composition is heated to be converted into the plastic state and is compressed within the narrowing passage of the screw. When the melt of composition gets in the degasing zone, the pressure drops to nil due to abrupt expansion of the screw passage, and noxious volatile components are released and removed through the opening of the casing. Then the polymeric mass is subjected to secondary compression within the narrowing passage of the screw to be conditioned for the moulding process.

The advantage of the machine of the above-described type reside in that it permits the release of moisture, low molecular weight fractions and gas inclusions which may impair quality of final products, during the processing. However, in processing polymer compositions having low bulk density (such as dry highly filled polymer compositions) certain difficulties arise. The material cannot move under gravity from the hopper through the charging opening into the screw passage since it has a trend to clogging. The opening in the degasing zone cannot provide for normal charging of the material into the screw passage because the degasing zone is not in communication with the zone of charging polymer melt. Clogging of material within the charging opening of the heated casing reduces the productivity of the machine. Feeding the machine with a loose, uncompacted mass lowers the efficiency of processing since the machine runs "underfed." In addition, the uncompacted polymer composition entrains large amount of air into the screw passage, and this air has no time to be released in the degasing zone and gets entrapped in finished products in the form of bubbles. The presence of bubbles in finished products impairs their quality.

Another, more widely used apparatus for processing polymer compositions is a machine having a compression plastication arrangement. The plastication arrangement of such machine comprises a heated cylindrical casing with a charging opening having a hopper containing a polymer composition being processed, and a screw mounted within the casing coaxially therewith. The rotating screw conveys the material. The volume of the screw passage in this machine, as differed from that described above, decreases from the charging zone towards the zone of expulsion of the polymer composition into a moulding device in a degree depending on the type of material being processed. The machine for processing polymer composition with a compression plastication arrangement functions in the following manner. The composition being processed is supplied under gravity from the hopper into the passage of the rotary screw and is conveyed along the heated casing. As the composition moves along, it is melted, stirred and compressed within the narrowing passage of the screw. Then the composition, which is thus prepared, is supplied to a moulding device. The advantage of the machine having the compression plastication arrangement consists in relative simplicity of the manufacture thereof. However, this machine features all disadvantages of the above-described machine, with the only difference that more air bubbles are observed in finished products. This is due to the fact that there is no device for removing the gaseous phase from the melt in this machine.

The main object of the invention is to provide a plastication arrangement in a machine for processing polymeric materials having a construction which enables high quality and efficient processing of polymeric materials having low bulk density.

Still another object of the invention is to provide for compaction of polymeric material in the zone of its charging to the screw and improve the efficiency of processing of polymeric material.

Further object of the invention is to remove excess air from the polymeric material being processed.

These and other objects of the invention are accomplished by that in a plastication arrangement of a machine for processing polymeric materials comprising a charging hopper and a screw for conveying polymeric material for processing enclosed in a heated casing, according to the invention, in the zone of charging the material from the hopper to the screw, there is provided a device for creating reduced pressure within the casing thus facilitating the displacement of material from the hopper into the screw passage.

The above objects are accomplished by that in a plastication arrangement of a machine for processing polymeric materials comprising a charging hopper and a screw for conveying polymeric material for processing enclosed in a heated casing, according to the invention, in the zone of charging the material from the hopper to the screw, there is provided a device for creating reduced pressure within the casing thus facilitating the displacement of material from the hopper into the screw passage.

The device for creating reduced pressure within the casing is preferably provided with a drain pipe mounted in the screw casing and a filtering screen urged by a spring against the screw.

Perforations of the filtering screen are preferably made enlarging towards the drain pipe.

The diameter of perforations of the filtering screen at the surface in contact with the screw is preferably at least 0.01 t, wherein t is thickness of the filtering screen.

In another embodiment, the device for creating reduced pressure within the casing may comprise a drain pipe mounted in an annular groove made in the screw casing, a perforated sleeve which has the inner surface in an intimate contact with the screw and the outer surface in an intimate contact with to the casing being preferably incorporated in the groove.

The essence of the present invention consists in the following.

Due to the fact that the device for creating reduced pressure within the casing is mounted in the zone of charging the material, air flow directed from the zone of normal pressure over the hopper towards the zone of reduced pressure within the casing entrains particles of the polymeric material clogging the charging opening, compacts them and supply them into the rotary screw passage thereby providing for normal feeding conditions when processing low bulk weight compositions.

Since the device for creating reduced pressure within the casing has the drain pipe mounted in the screw casing, there is an opportunity of removing air from the casing and maintaining a constant reduced pressure therein.

The filtering screen tightly pressed against the screw by means of a spring provides for separation of the composition being processed from the air flow. The material being processed, together with the air flow, moves from the hopper through the charging opening into the screw passage, precipitates to the screen surface in contact with the screw and is thus compacted. The compacted precipitated layer of the polymer composition is continuously removed from the filtering screen by the turns of the rotary screw and is conveyed axially therealong through all processing stages, while the air flow separated by the screen is eliminated into atmosphere through the drain pipe.

Intimate contact of the screw with the screen provides for complete cleaning thereof and prevents the screen from clogging with the composition.

The filtering screen has perforations enlarging towards the drain pipe in order that fine components of the composition being processed which get into the screen perforations could freely pass therethrough with the air flow. This shape of the screen perforations provides for cleaning of the screen and prevents it from clogging with the polymeric material.

The diameter of the perforations at the surface of the screen in contact with the screw is at least 0.01 t, wherein t is thickness of the filtering screen. This size of the perforations permits the reduction of total drag of the filtering screen thereby improving the efficiency of feeding the plastication arrangement with polymeric material and preventing the filtering screen from clogging with the material being processed.

Another embodiment of the device for creating reduced pressure within the casing comprises a drain pipe mounted in an annular groove made in the screw casing.

The goove incorporates a perforated sleeve which has the inner surface in an intimate contact with the screw and the outer surface in an intimate contact with the casing. This embodiment of the device for creating reduced pressure within the casing also provides for improved efficiency of operation of the plastication arrangement and is simple in construction.

Therefore, the present invention enables an improvement of the efficiency of operation of the machine for processing polymeric materials of low bulk weight, compaction of polymeric material at the feeding stage and elimination of excess air from the polymeric material being processed.

Elimination of excess air from the material enables an improvement of quality of finished products obtained from the material being processed.

The invention will be better understood from the following detailed description of specific embodiments thereof with reference to the accompanying drawings, in which.

Figure 1:
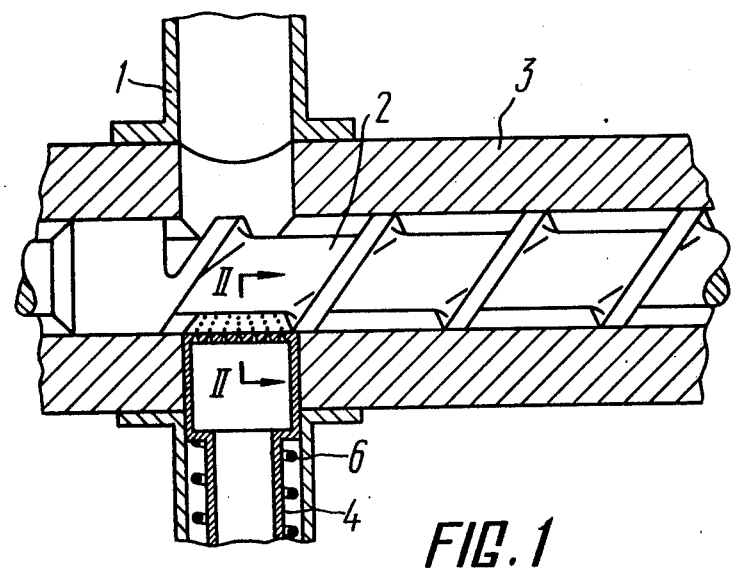
FIG. 1 is a general view of the plastication arrangement in a machine for processing polymeric materials.
Figure 2:
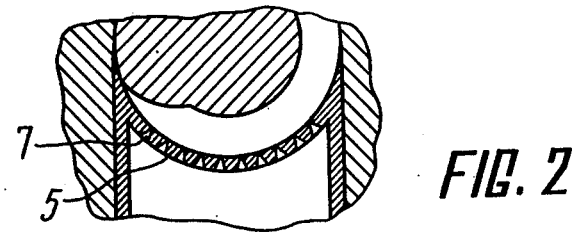
FIG. 2 is a sectional view taken along the line II—II in FIG. 1.
Figure 3:
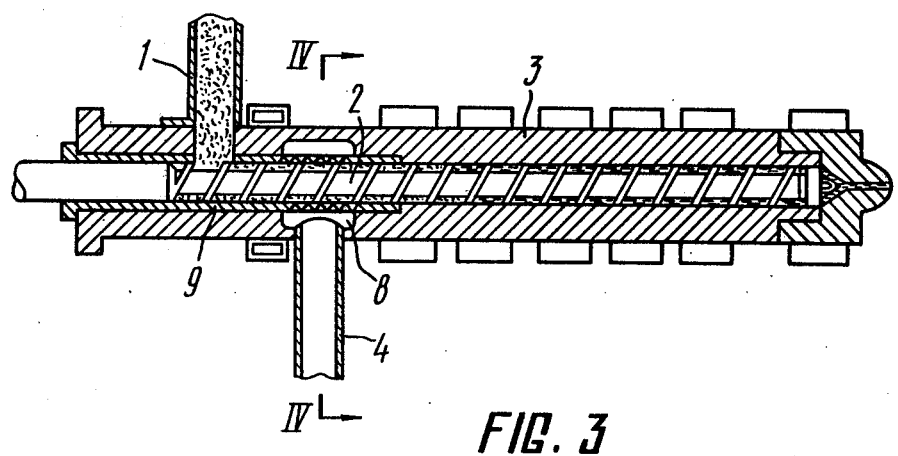
FIG. 3 is another embodiment of the plastication arrangement in a machine for processing polymeric materials shown as general view.
Figure 4:
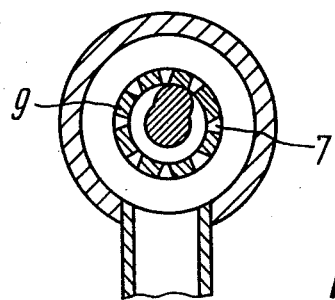
FIG. 4 is a sectional view taken along the line IV—IV in FIG. 3.

The plastication arrangement comprises a charging hopper 1 having a cylindrical or different shape suitable for supplying a polymeric material to a screw 2 enclosed in a heated casing 3. The screw 2 conveys the material for processing. In the zone of charging the material from the hopper 1 to the screw 2, there is provided a device for creating reduced pressure within the casing 3. This device is provided with a drain pipe 4 mounted in the casing 3 and a filtering screen 5 mounted to the drain pipe 4 and urged against the screw 2 by means of a spring 6. The surface of the screen 5 in contact with the surface of turns of the screw 2 should by cylindrical so as to provide for cleaning from the material being processed. In order to separate the material being processed from air flow, the screen 5 has perforations 7. The perforations 7 are made enlarging towards the drain pipe 4. The diameter of the perforations 7 at the surface of the filtering screen 5 in contact with the screw 2 is at least 0.01 t, wherein t is thickness of the screen 5. This provides for reduction of total drag of the filtering screen 5 and prevents it from clogging with the material.

In another embodiment of the device for creating reduced pressure within the casing 3, the device comprises the drain pipe 4 which is mounted in an annular groove 8 of the casing 3 of the screw 2. In the zone of arrangement of the pipe 4 in the groove 8 the groove is made with an enlarged diameter. A sleeve 9 is incorporated in the groove 8. The sleeve 9 is in an intimate contact with the inner surface thereof with the screw 2 and the outer surface of the sleeve is in an intimate contact with the casing 3. The sleeve 9 has perforations 7. The perforations 7 are similar to those provided in the filtering screen 5 and are designed for the same purpose.

The arrangement according to the invention functions in the following manner.

Polymeric material is supplied to the hopper 1 and to the charging zone of the screw 2 with an air flow entering, together with the material, from atmosphere, the zone of reduced pressure provided within the casing in the zone of charging the screw 2. The material entering the charging zone precipitates to the surface of the filtering screen 5 in contact with the screw 2 and is compacted. The spring 6 provides for constant urging of the screen 5 against the screw 2 thereby preventing the screen 5 from clogging with the material being processed. The rotary screw 2 continuously removes with the turns thereof the precipitated layer of material from the surface of the filtering screen 5 and conveys the material axially therealong so that that the material is conveyed through all processing stages: melting, stirring and moulding.

During the cleaning of the filtering screen 5 from the layer of material precipitated thereon, excess air entering the charging zone is eliminated through the cleaned perforations 7 of the screen 5 along the pipe 4. Thus the desired reduced pressure is continuously maintained in the zone of charging of the material to the screw and reliable operation of the apparatus as a whole is obtained.

Where the perforated sleeve 9 is used to replace the filtering screen 5, the plastication process is effected similarly to that described above.

The arrangement according to the invention may be most efficiently used in processing various polymer compositions having low bulk density.

What is claimed is:

1. A plastication arrangement for processing polymeric materials, comprising:
    an elongated heated generally cylindrical casing;
    a rotatable screw axially disposed within said casing for feeding plasticized materials along the longitudinal axis thereof;
    a charging hopper for polymeric material having an outlet adjacent and in communication with a portion of said screw;
    drain means for creating reduced pressure within said casing;
    filter means within said casing adjacent said screw for preventing material within said casing from entering said drain means; and
    means for cleaning said filter means when said screw is rotated.

2. A plastication arrangement according to claim 1, wherein said drain means comprises a drain pipe mounted in the screw casing, said filter means comprises a foraminous filtering screen, and said cleaning means comprises a spring for urging said screen against said screw.

3. A plastication arrangement according to claim 2, wherein the foraminations of the screen are tapered and enlarge towards the drain pipe.

4. A plastication arrangement according to claim 2, wherein the diameters of the foraminations at the surface of the screen in contact with the screw are at least 0.01 t, wherein t is the thickness of the filtering screen.

5. A plastication arrangement according to claim 3, wherein the diameters of the perforations at the surface of the screen in contact with the screw are at least 0.01 t, wherein t is the thickness of the filtering screen.

6. A plastication arrangement according to claim 1, wherein said drain means comprises a drain pipe mounted in an annular groove in the screw casing, further comprising a perforated sleeve disposed in the groove with the inner surface thereof in intimate contact with the screw and the outer surface thereof in intimate contact with the casing.

7. A plastication arrangement according to claim 1, wherein said drain means is disposed adjacent said screw portion.

8. A plastication arrangement according to claim 1, wherein said cleaning means comprises means for urging said filter means against said screw.

9. A plastication arrangement according to claim 8, wherein the surface of said filter means adjacent said screw is cylindrical.

* * * * *

UNITED STATES PATENT OFFICE
CERTIFICATE OF CORRECTION

Patent No. 4,130,901                    Dated December 19, 1978

Inventor(s) Sofia Mikhailovna Borovikova, et al

It is certified that error appears in the above-identified patent and that said Letters Patent are hereby corrected as shown below:

Column 3, line 16 and 17: "an" should be cancelled.

line 17: Cancel "to" and after "casing" insert a comma.

line 19: "cousists" should be --consists--.

Column 4, line 1: "goove" should be --groove--.

Signed and Sealed this

Tenth Day of July 1979

[SEAL]

Attest:

LUTRELLE F. PARKER
Attesting Officer    Acting Commissioner of Patents and Trademarks